United States Patent
Schiele et al.

(10) Patent No.: US 8,858,390 B2
(45) Date of Patent: Oct. 14, 2014

(54) METHOD FOR OPERATING A DRIVETRAIN

(75) Inventors: Peter Schiele, Kressbronn (DE); Falko Platzer, Friedrichshafen (DE); Michael Sohler, Isny (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 142 days.

(21) Appl. No.: 13/512,909

(22) PCT Filed: Nov. 22, 2010

(86) PCT No.: PCT/EP2010/067887
§ 371 (c)(1),
(2), (4) Date: May 31, 2012

(87) PCT Pub. No.: WO2011/069812
PCT Pub. Date: Jun. 16, 2011

(65) Prior Publication Data
US 2012/0238404 A1    Sep. 20, 2012

(30) Foreign Application Priority Data
Dec. 10, 2009 (DE) .......................... 10 2009 054 468

(51) Int. Cl.
| | | |
|---|---|---|
| *B60W 10/02* | (2006.01) | |
| *B60W 10/08* | (2006.01) | |
| *B60W 30/18* | (2012.01) | |
| *B60K 6/48* | (2007.10) | |
| *F16D 48/06* | (2006.01) | |
| *B60W 20/00* | (2006.01) | |

(52) U.S. Cl.
CPC ........ *F16D 48/06* (2013.01); *F16D 2500/1066* (2013.01); *B60W 20/00* (2013.01); *F16D 2500/50215* (2013.01); *B60W 10/08* (2013.01); *B60W 10/026* (2013.01); *B60W 30/18063* (2013.01); *B60K 6/48* (2013.01); *Y02T 10/6221* (2013.01); *B60W 2510/0225* (2013.01); *B60W 2710/025* (2013.01); *B60W 2710/022* (2013.01); *B60W 30/18027* (2013.01); *F16D 2500/70426* (2013.01)

USPC .................................................. 477/5; 475/5

(58) Field of Classification Search
USPC .................................................. 477/5; 475/5
See application file for complete search history.

(56) References Cited

U.S. PATENT DOCUMENTS

| 6,808,470 B2 | 10/2004 | Boll |
| 7,730,982 B2 | 6/2010 | Hidaka et al. |
| 7,762,922 B2 * | 7/2010 | Dreibholz et al. ............... 477/5 |
| 8,109,856 B2 | 2/2012 | Kaltenbach |
| 2003/0153429 A1 | 8/2003 | Boll |
| 2004/0038774 A1 | 2/2004 | Kuroda et al. |
| 2006/0272869 A1 | 12/2006 | Hidaka et al. |

(Continued)

FOREIGN PATENT DOCUMENTS

| CN | 1876460 A | 12/2006 |
| DE | 100 55 737 A1 | 7/2001 |

(Continued)

OTHER PUBLICATIONS

Chinese Office Action issued in corresponding Chinese Application No. 201080053850.8 mailed on May 5, 2014.

*Primary Examiner* — Derek D Knight
(74) *Attorney, Agent, or Firm* — Davis & Bujold, PLLC; Michael J. Bujold

(57) ABSTRACT

A method of operating a drive train having a hybrid drive including a combustion engine and electric motor, a clutch located between the engine and the motor, a transmission, a starting element and a brake pedal. For electric crawling from a state in which the clutch is disengaged, the brake pedal is activated and the combustion engine is turned off, initially the starting element is brought to or maintained at a filling pressure. Next, the rotational speed of the electric motor is adjusted to be higher, by a defined slippage rotational speed, than a transmission side rotational speed. When this slippage is reached, the starting element is further engaged to create a crawl torque at the output. The electric motor continues at rotational speed control so that the slippage is maintained.

10 Claims, 2 Drawing Sheets

(56) References Cited

U.S. PATENT DOCUMENTS

| | | |
|---|---|---|
| 2007/0207892 A1 | 9/2007 | Dreibholz et al. |
| 2009/0178866 A1 | 7/2009 | Schwemer et al. |
| 2011/0048822 A1 | 3/2011 | Kaltenbach et al. |

FOREIGN PATENT DOCUMENTS

| | | |
|---|---|---|
| DE | 102 09 839 A1 | 9/2002 |
| DE | 101 58 536 A1 | 7/2003 |
| DE | 10 2006 005 468 A1 | 8/2007 |
| DE | 10 2008 044 248 A1 | 6/2009 |
| DE | 10 2008 000 045 A1 | 7/2009 |
| DE | 10 2009 001 293 A1 | 9/2010 |
| EP | 2 050 641 A2 | 4/2009 |
| GB | 2 356 438 A | 5/2001 |
| WO | 2008/028816 A1 | 3/2008 |
| WO | 2008098801 A1 | 8/2008 |

* cited by examiner

METHOD FOR OPERATING A DRIVETRAIN

This application is a national stage completion of PCT/EP2010/067887 filed Nov. 22, 2010, which claims priority from German Application Serial No. 10 2009 054 468.2 filed Dec. 10, 2009

FIELD OF THE INVENTION

The invention concerns a method for operating a drive train comprising at least a transmission and a hybrid drive of a motor vehicle.

BACKGROUND OF THE INVENTION

The main components of a drive train of a motor vehicle are a drive aggregate and a transmission. A transmission converts torque and rotational speeds and thereby sets the tractional force passed by the drive aggregate. The present invention here concerns a method for operating a drive train which comprises at least a transmission which has, as the drive aggregate, a hybrid drive including a combustion engine and an electric motor, wherein a clutch is positioned between a combustion engine and an electric motor of the hybrid drive, and wherein the drive train also has a transmission internal starting element or a transmission external starting element. Such a drive train is also referred to as a parallel hybrid.

In such a parallel hybrid, there exists the difficulties of achieving a fuel efficient, comfortable, and low loss crawling start. This crawling start is meant as an operating mode of the drive train at which the drive train turns when the accelerator pedal or the throttle, respectively, is not operated. A crawling start has to be differentiated from a start at which the accelerator pedal or throttle, respectively, of the drive train is operated.

Based on this, the present invention takes the above problem and creates a novel method for operating a drive train which comprises of a transmission and a hybrid drive.

SUMMARY OF THE INVENTION

In accordance with the invention, an electric crawling start of a motor vehicle, beginning at an initial state of the drive train, in which the clutch positioned between the combustion engine and the electric motor is disengaged, and where the brake pedal is activated and the accelerator pedal is not activated and the combustion engine of the hybrid drive is preferably turned off, is operated in a way such that, upon deactivation or after deactivation of the brake pedal, the drive train is brought to the filling pressure or kept at filling pressure, that immediately thereafter the electric motor of the hybrid drive, which is operated in a transmission speed controlled mode, is brought to a rotational speed so that the rotational speed of the electric motor is higher by a defined slippage rotational speed than the transmission side rotational speed of the transmission, and that when reaching this slippage, an additional engagement of the drive elements, which are operated in a torque activation mode, establishes, at the output, a crawl torque for a crawling start, wherein here the electric motor continues to operate in a rotational speed controlled mode to maintain the slippage needed for the crawling start.

The inventive method enables a fuel efficient, comfortable, and low loss crawling start of a drive train having a parallel hybrid.

BRIEF DESCRIPTION OF THE DRAWINGS

Preferred, further embodiments of the invention are characterized in the following specification, examples of embodiments of the invention are further explained by the drawings, but are not limited thereby. These show.

DETAILED DESCRIPTION OF THE DRAWINGS

The present invention concerns a method for operating a drive train of a motor vehicle which comprises at least a transmission and a hybrid drive.

Figure 1:
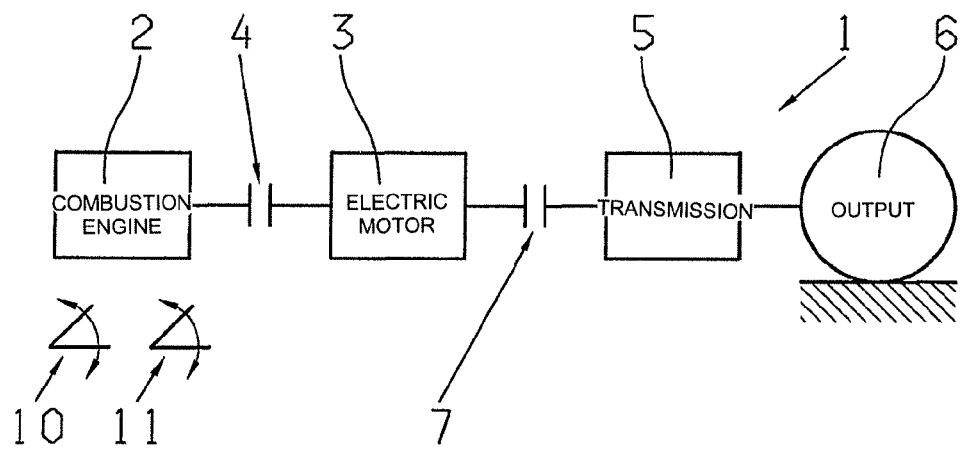
FIG. 1 a drive train schematic of a motor vehicle in which the inventive method can be applied.

FIG. 1 shows an example of a drive train schematic of a motor vehicle in which the inventive method can be applied. Hereby, FIG. 1 schematically shows a drive train 1 of a motor vehicle, wherein the drive train 1, in accordance with the FIG. 1, is a hybrid drive which comprises a combustion engine 2 and an electric motor 3. Positioned between the combustion engine 2 and the electric motor 3 is a clutch 4 which, at the time when the drive train 1 is operated exclusively by the electric motor 3, is disengaged. Beside the hybrid drive, the drive train 1 comprises, in accordance with FIG. 1, a transmission 5 that transforms and provides traction force, offered by the hybrid drive, to an output 6, meaning the driven wheels of the drive train 1. The transmission 5 can, for instance, be designed as an automatic transmission or a semi-automatic transmission. In an automatic transmission, shifting is executed without interruption in traction force, and in a semi-automatic transmission, the shifting is executed with an interruption in traction force. In the drive train of FIG. 1, an additional clutch 7 is positioned between the electric motor 3 of the hybrid drive and the transmission 5. This clutch 7 serves as a transmission external starting element.

Figure 2:
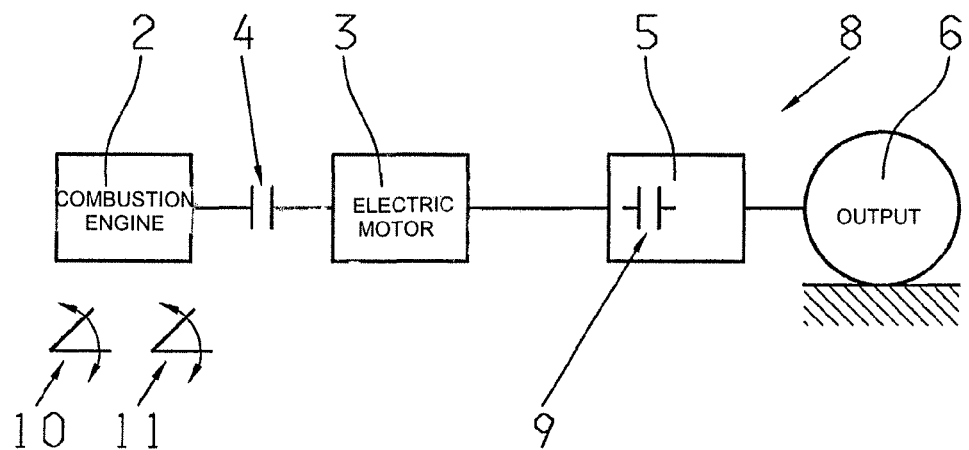
FIG. 2 an alternative drive train schematic of a motor vehicle in which the inventive method can be applied.

FIG. 2 shows an exemplary, additional drive train schematic of a motor vehicle in which the inventive method can be applied, wherein the drive train 8 of the drive train schematic of FIG. 2 differentiates itself from the drive train 1 of the drive train schematic in FIG. 1 by the fact that the clutch 7 or the transmission external starting element, respectively, is omitted and is replaced by a transmission internal starting element 9.

The two schematically presented drive trains in FIG. 1 and FIG. 2 are each designed as a parallel hybrid and each have, in accordance with FIGS. 1 and 2, a throttle or accelerator pedal 10, respectively, and a brake pedal 11.

In addition to the schematically shown constructed assemblies in FIGS. 1 and 2 of these drive trains 1 or 8, respectively, the drive trains also have, not shown in FIGS. 1 and 2, additional constructed assemblies, for instance a not shown electric energy storage which interacts with the hybrid drive in a way such that the electric energy storage, when the electric motor 3 of the hybrid drive is operated as a generator, is charged at a high rate, and when the electric motor 3 of the hybrid drive is operated as a motor, discharges at a higher rate.

The drive trains in FIGS. 1 and 2 also have a not shown main hydraulic pump which is driven by the hybrid drive, through which hydraulic consuming parts of the drive train 1 or 8, respectively, especially hydraulic consumers of the transmission 5, can be supplied with hydraulic power.

In addition to a not shown main hydraulic pump, the drive trains of FIG. 1 or 2, respectively, have also a not shown auxiliary hydraulic pump which is driven independently by the hybrid drive to provide, when the combustion engine 2 and also the electric motor 3 of the hybrid drive have stopped, the hydraulic consuming parts of each drive train 1 or 8, respectively, with hydraulic power.

This present invention concerns a method for operating such a drive train having a transmission and a hybrid drive, namely such details for operating the drive train which are related to its crawling start.

Figure 3:
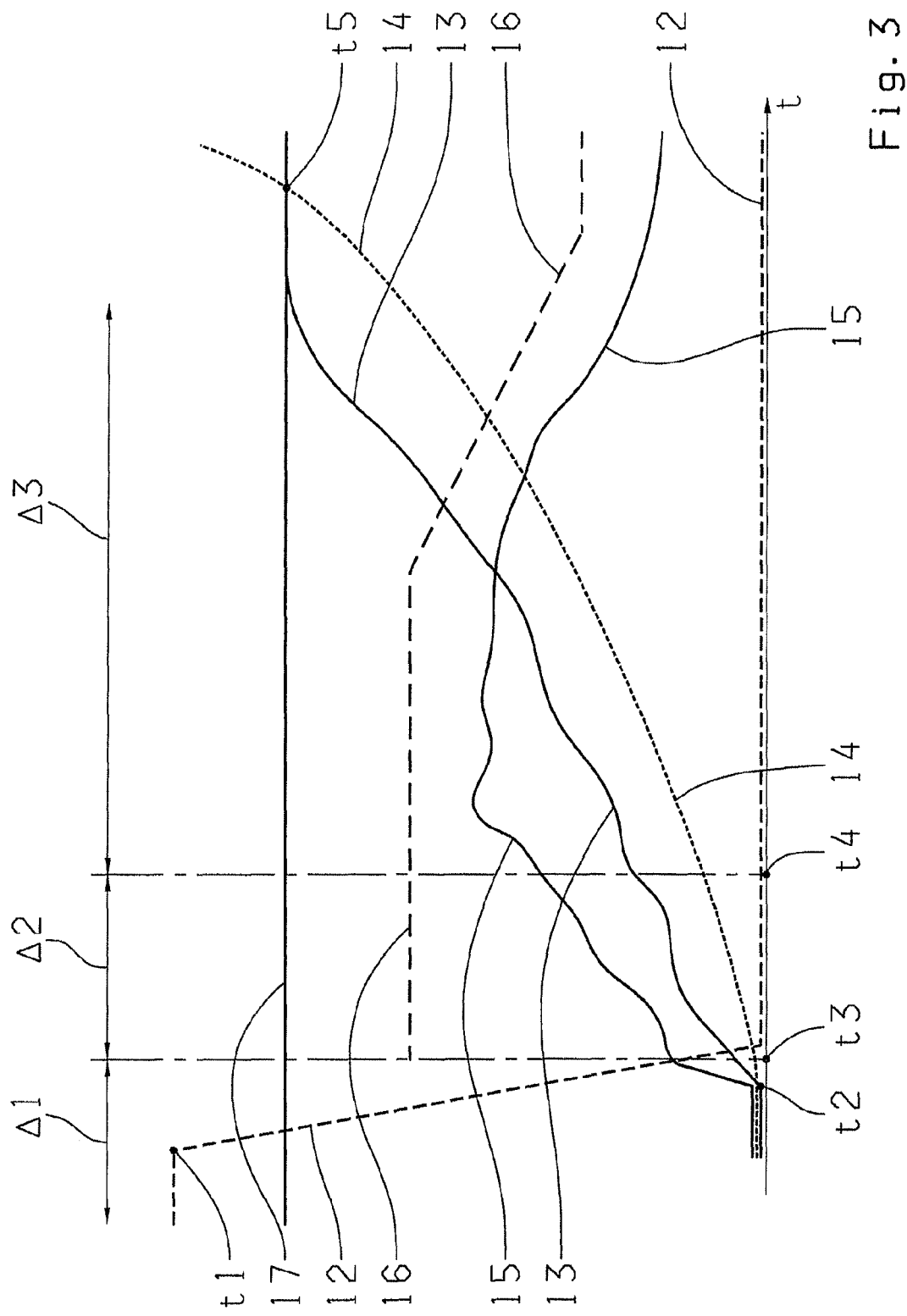
FIG. 3 a diagram for the clarification of the inventive method for operating a drive train.

The details of the crawling start are explained in the following with reference to the diagram of FIG. 3, wherein the diagram of FIG. 3 shows, over the time t, different chronologies of signal patterns, meaning a signal pattern 12 which visualizes, due to the activation of the brake pedal 11, the requested or rather provided brake pressure of an operating brake, a signal pattern 13 visualizes the course of a rotational speed of an electric motor 3 of the hybrid drive in accordance with the invention, a signal pattern 14 which shows a rotational speed at the transmission side at which the rotational speed 13, which is provided by the electric motor 3, has the defined slippage for the crawling start, a signal pattern 15 which visualizes the creation of the crawl torque of the output 6, in accordance with the invention, as well as the signal patterns 16 and 17, wherein the signal pattern 16 shows a maximum permissible crawl torque, and the signal pattern 17 shows a maximum permissible idling rotational speed of the electric motor 3 of the hybrid drive.

In the sense of the invented method, an electric crawling start of the drive train or rather the motor vehicle is established in a way and based on an initial state of the drive train, in which a clutch 4 that is positioned between the combustion engine 2 of the hybrid drive and its electric motor 3 is disengaged, in which the brake pedal 11 is activated, in which the throttle 10 is not activated, in which the combustion engine 2 of the hybrid drive is preferably turned off, and in which the electric motor 3 of the hybrid drive has stopped or runs just at a low rotational speed, that during the deactivation or after deactivation of the brake pedal 11, the transmission external starting element 7, as shown in the embodiment example of FIG. 1, or the transmission internal starting element 9, as shown in the embodiment example of FIG. 2, is brought to filling pressure or kept at filling pressure.

At the time, when hereby the starting element 7 or 9, respectively, is kept at the filling pressure, it is already completely filled at the initial state of the drive train. To the contrary, if the starting element 7 or 9, respectively, is brought to filling pressure, it has in the initial state of the drive train a filled pressure which is above the filling pressure so that, during the deactivation or after deactivation of the brake pedal 11, the starting element 7 or 9, respectively, is drained to filling pressure.

The filling pressure of the transmission external starting element 7 or the transmission internal starting element 9, respectively, needs to be understood as a pressure at which the starting element 7 or 9, respectively, is partially engaged up to the so-called touch point, which is also called a positioning point. At the time when the starting element 7 or 9, respectively, is filled to the filling pressure, and is therefore partially closed up to the touch point or positioning point, respectively, it is partially engaged and although it is filled, no noteworthy torque transfer can be achieved through each of the starting elements 7 or 9, respectively.

At the time when at each starting element 7 or 9, respectively, the filling pressure is present, immediately thereafter the electric motor 3 of the hybrid drive is brought to a rotational speed so that the rotational speed of the electric motor 3 is higher by a defined slippage rotational speed than the rotational speed at the transmission side of the transmission 5, whereby the electric motor 3 of the hybrid drive is operated in a rotational speed controlled mode.

The transmission side rotational speed of the transmission 5, to which the defined slippage rotational speed of the electric motor 3 of the hybrid drive is brought to, can be, for instance, a transmission input rotational speed of the transmission 5 or it can be an actual transmission output rotational speed, multiplied with a transmission gear ratio of the transmission 5.

In the diagram of FIG. 3 at the time point t1, in accordance with the signal pattern 12, the brake pedal is deactivated, wherein immediately thereafter, at the time point t2 and in accordance with the signal pattern 13, the rotational speed of the electric motor 3 of the hybrid drive is increased. At the time point t3, the rotational speed of the electric motor 3 is larger, by a defined slippage rotational speed, than the transmission side rotational speed of the transmission 5 as visualized by the signal pattern 14, for instance larger than the transmission input rotational speed or the transmission output rotational speed which is multiplied with an actual transmission gear ratio.

When the defined slippage between the rotational speed of the electric motor 3 and the rotational speed at the transmission side of the transmission 5 is reached, thus the time point t3 in the diagram of FIG. 3, the starting element which is still at filling pressure, meaning the starting element 7 in the embodiment example in FIG. 1 and the starting element 9 in the embodiment example in FIG. 2, are further engaged so as to create or rather provide a crawl torque which is needed for a crawling start at the output 6. Hereby, the electric motor 3 of the hybrid drive is further operated in a rotational speed controlled mode to maintain the slippage, during a continued crawling start, between the rotational speed of the electric motor 3 and the rotational speed at the a transmission side of the transmission 5. The starting element 7 or 9, respectively, is hereby operated in a torque activation mode.

During the entire event of the electrical crawling start, the provided crawl torque of the signal pattern 15 at the output 6 is limited to a maximum permissible limit crawl torque of the signal pattern 16. The crawl torque 15 which is present at the output 6 can therefore be at the maximum at a value of the maximum permissible limit crawl torque 16, whereby in the embodiment example of the FIG. 3 the crawl torque 15, which is provided at the output 6, is always smaller than the limit crawl torque 16.

The amount of the maximum permissible limit crawl torque 16 is dependent on the maximum applicable torque of the electric motor 3 of the hybrid drive wherein the maximum applicable torque of the electric motor 3 is dependent on the charged condition of its energy storage device of the drive train.

During the entire electrical crawling start, the generated crawl speed is also monitored, wherein at the time, when a maximum permissible crawl speed is reached during the crawling start, a speed control for the drive train is executed in a way that a constant crawl speed can be guaranteed which relates to the maximum permissible crawl speed. A maximum permissible crawl speed is reached at the time point t4 in the embodiment example of FIG. 3.

During the entire electric crawling start, the rotational speed of the electric motor 3 is also limited to its maximum permissible idling rotational speed. Thus, the rotational speed of the electric motor 3 can only achieve the maximum value of the maximum permissible idling rotational speed, wherein in the embodiment example of FIG. 3 and in accordance with the signal patterns 13 and 17, the electric motor 3 reaches its maximum permissible idling rotational speed at the time point t5.

As presented above and at the time point t3, the respective drive element 7 or 9, respectively, is further engaged based on the filling pressure and at the time point t4, a speed control is activated for the crawling start. In the time interval Δ1, the respective drive train is therefore at a halt. During the time intervals Δ2 and Δ3, the respective drive train crawls, wherein a speed control is activated in the time interval Δ3. During the entire time intervals Δ2 and Δ3, the electric motor 3 of the hybrid drive is rotational speed controlled and the respective drive element 7 or 9, respectively, is operated in a torque activation mode.

As already mentioned, the respective drive train 1 or 8 has, independent of the combustion engine 2 and the electric motor 3, an electrically operated auxiliary hydraulic pump, which can, at the time when the combustion engine 2 is turned off and also the electric motor 3 has stopped, supply hydraulic consuming parts with hydraulic power, such as the drive elements 7 or 9, respectively, so that the execution of the inventive method creates the filling pressure or rather maintains the filling pressure, for the drive element 7 or 9 either during the deactivation or after the deactivation of the brake pedal 11.

During the entire duration of the electric crawling start, activation of the accelerator pedal 10 is monitored. At the time when the accelerator pedal 10 is not activated, the crawling start will be continued. To the contrary, if an activated accelerator pedal 10 is recognized, the crawling start is terminated and a change takes place to starting, wherein the electric motor 3, for the starting, is operated in a torque regulated mode and the starting element 7 or 9, respectively, is operated in a rotational speed controlled mode The invention enables a fuel saving crawling start. At that time and before the crawling start as well as during the crawling start, the combustion engine 2 of the hybrid drive is turned off. Also, the electric motor 3 of the hybrid drive is off before the crawling start or is operated at a minimum rotational speed. This ensures that the electric energy storage device is not discharged at a higher rate by the electric motor 3 of the hybrid drive, which also results in savings of the gasoline because the electric energy storage device does not have to be recharged at a later time, due to the omitted discharge.

Only at the time when the brake pedal is deactivated, the electric motor is accelerated and the noise generation can be kept as low as possible. Thus, the comfort level can be increased during the crawling start.

Due to the fact that a low slippage is maintained during the entire crawling start, between the rotational speed of the electric motor 3 (see signal pattern 13) and the rotational speed of the transmission 5 at the transmission side (see signal pattern 14), only a low amount of dissipated power is created at the starting element 7 or 9, respectively.

Due to this slippage, also possible oscillations, which are created in the drive train during the crawling start, are effectively reduced. This fact also increases the comfort level during the crawling start.

REFERENCE CHARACTERS

1 Dive Train
2 Combustion Engine
3 Electric Motor
4 Clutch
5 Transmission
6 Output
7 Transmission external starting element
8 Drive Train
9 Transmission internal starting element
10 Acceleration pedal
11 Brake Pedal
12 Signal Pattern
13 Signal Pattern
14 Signal Pattern
15 Signal Pattern
16 Signal Pattern
17 Signal Pattern

The invention claimed is:

1. A method of operating a drive train of a motor vehicle for a crawling start of the motor vehicle in which the drive train comprises a hybrid drive with a combustion engine (2) and an electric motor (3); a clutch (4) is positioned between the combustion engine (2) and the electric motor (3); a transmission (5) is positioned between the hybrid drive and an output (6); the drive includes either a transmission internal starting element (9) or a transmission external starting element (7) along with a brake pedal (11) and an accelerator pedal (10), the method comprising the steps of:

initiating the crawling start of the motor vehicle, with the drive train being in a starting condition in which the clutch (4), which is positioned between the combustion engine (2) and the electric motor (3), is disengaged, and the brake pedal (11) is activated and the accelerator pedal (10) is unactivated, and the combustion engine (2) of the hybrid drive is turned off;

either bringing the starting element (7, 9) to filling pressure or maintaining the filling pressure of the starting element (7, 9) either by deactivation or after deactivation of the brake pedal (11);

immediately thereafter bringing the electric motor (3) of the hybrid drive, which is operated in a rotational speed controlled mode, to a rotational speed that is higher by a defined slippage rotational speed than a transmission side rotational speed of the transmission (5);

further engaging the starting element (7, 9) to create torque at the output (6) for the crawling start, when the slippage is reached; and continually operating the electric motor (3) in the rotation speed controlled mode to maintain the slippage for the crawl starting.

2. The method according to claim 1, further comprising the step of ensuring that the starting element (7, 9), at an initial state, is already filled at the filling pressure such that the starting element (7, 9) is maintained, either during the disengagement or after the disengagement of the brake pedal (11), at the filling pressure.

3. The method according to claim 1, further comprising the step of ensuring that the starting element (7, 9), at an initial state, is filled more than the filling pressure such that the starting element (7, 9) is drained, either during the disengagement or after the disengagement of the brake pedal (11), to the filling pressure.

4. The method according to claim 1, further comprising the step of bringing the electric motor to a rotational speed that is higher by a defined slippage rotational speed than a transmission output rotation speed of the transmission (5) which is multiplied by an actual transmission gear ratio.

5. The method according to claim 1, further comprising the step of limiting the crawl torque, which is provided at the output during an entire electric crawling start, to a maximum permissible crawl torque, and the maximum permissible crawl torque depends upon an applicable torque of the electric motor (3) of the hybrid drive.

6. The method according to claim 1, further comprising the step of executing a speed control to guarantee a constant crawl speed when a maximum permissible crawl speed is reached, during the crawling start.

7. The method according to claim 1, further comprising the step of, during the entire electric crawl starting, limiting the rotational speed of the electric motor (3) to a maximum permissible idle rotation speed.

8. The method according to claim 1, further comprising the step of monitoring the activation of the accelerator pedal (10), during an entire electric crawl starting, such that when the accelerator pedal (10) is deactivated the crawling start is continued, and when the accelerator pedal (10) is activated, the crawling start is interrupted and a starting is executed, the electric motor (3) is operated for the starting in a torque controlled mode and the starting element (7, 9) is operated in a rotational speed controlled mode.

9. A method of operating a drive train of a motor vehicle for a crawling start of the motor vehicle in which the drive train comprises a hybrid drive with a combustion engine (2) and an electric motor (3); a clutch (4) is positioned between the combustion engine (2) and the electric motor (3); a transmission (5) is positioned between the hybrid drive and an output (6); the drive includes either a transmission internal starting element (9) or a transmission external starting element (7) along with a brake pedal (11) and an accelerator pedal (10), the method comprising the steps of:
- initiating the crawling start of the motor vehicle, with the deive train being in a starting condition in which the clutch (4), which is positioned between the combustion engine (2) and the electric motor (3), is disengaged, and the brake pedal (11) is activated and the accelerator pedal (10) is unactivated, and the combustion engine (2) of the hybrid drive is turned off;
- either bringing the starting element (7,9) to filling pressure or maintaining the filling pressure of the starting element (7, 9) either by deactivation or after deactivation of the brake pedal (11);
- immediately thereafter bringing the electric motor (3) of the hybrid drive, which is operated in a rotational speed controlled mode, to a rotational speed that is higher by a defined slippage rotational speed than a transmission side rotational speed of the transmission (5);
- further engaging the starting element (7, 9) to create torque at the output (6) for the crawling start, when the slippage is reached;
- continually operating the electric motor (3) in the rotation seed controlled mode to maintain the slippage for the crawl starting; and
- immediately after the filling pressure is present at the starting element (7, 9), bringing the electric motor to a rotational speed that is higher by a defined slippage rotational speed than a transmission input rotation speed of the transmission (5).

10. A method of operating a drive train of a motor vehicle for a crawling start of the motor vehicle in which the drive train comprises a hybrid drive with a combustion engine (2) and an electric motor (3); a clutch (4) is positioned between the combustion engine (2) and the electric motor (3); a transmission (5) is positioned between the hybrid drive and an output (6); the drive includes either a transmission internal starting element (9) or a transmission external starting element (7) along with a brake pedal (11) and an accelerator pedal (10), the method comprising the steps of:
- initiating the crawling start of the motor vehicle, with the drive train being in a starting condition in which the clutch (4), which is positioned between the combustion engine (2) and the electric motor (3), is disengaged, and the brake pedal (11) is activated and the accelerator pedal (10) is unactivated, and the combustion engine (2) of the hybrid drive is turned off;
- either bringing the starting element (7,9) to filling pressure or maintaining the filling pressure of the starting element (7, 9) either by deactivation or after deactivation of the brake pedal (11);
- immediately thereafter bringing the electric motor (3) of the hybrid drive, which is operated in a rotational speed controlled mode, to a rotational speed that is higher by a defined slippage rotational speed than a transmission side rotational speed of the transmission (5);
- further engaging the starting element (7, 9) to create torque at the output (6) for the crawling start, when the slippage is reached;
- continually operating the electric motor (3) in the rotation speed controlled mode to maintain the slippage for the crawl starting; and
- either bringing or maintaining the starting element (7, 9) to filling pressure for the electric crawling start by means of an electrically operated auxiliary hydraulic pump.

* * * * *